United States Patent
McCauley et al.

(10) Patent No.: US 7,869,900 B2
(45) Date of Patent: Jan. 11, 2011

(54) INTEGRATED CUBER MANAGEMENT SYSTEM

(75) Inventors: Michael McCauley, Dallas, TX (US); Bart Parish, Corinth, TX (US)

(73) Assignee: Balcones Fuel Technology, Inc., Austin, TX (US)

( * ) Notice: Subject to any disclaimer, the term of this patent is extended or adjusted under 35 U.S.C. 154(b) by 1149 days.

(21) Appl. No.: 11/301,139

(22) Filed: Dec. 12, 2005

(65) Prior Publication Data

US 2007/0150476 A1 Jun. 28, 2007

(51) Int. Cl.
*G06F 7/66* (2006.01)
(52) U.S. Cl. .......................................... 700/196; 700/83
(58) Field of Classification Search .................. 700/83, 700/85, 196; 702/185
See application file for complete search history.

(56) References Cited

U.S. PATENT DOCUMENTS

| | | | | |
|---|---|---|---|---|
| 4,639,852 A | * | 1/1987 | Motomiya | 700/9 |
| 4,931,229 A | * | 6/1990 | Krimmel et al. | 264/3.3 |
| 4,942,514 A | * | 7/1990 | Miyagaki et al. | 700/85 |
| 5,748,495 A | * | 5/1998 | Arita et al. | 702/185 |
| 5,896,138 A | * | 4/1999 | Riley | 345/440 |
| 5,969,697 A | * | 10/1999 | Tani et al. | 345/2.1 |
| 2004/0030429 A1 | * | 2/2004 | Baba et al. | 700/83 |
| 2004/0200138 A1 | * | 10/2004 | Parish | 44/553 |
| 2005/0080507 A1 | * | 4/2005 | Silberg et al. | 700/196 |

\* cited by examiner

*Primary Examiner*—Albert Decady
*Assistant Examiner*—Steven R Garland
(74) *Attorney, Agent, or Firm*—William D. Wiese; DuBois, Bryant & Campbell, LLP

(57) ABSTRACT

A method and system for monitoring and controlling the processing of thermoplastics. The system includes a graphical interface and a server attached to the equipment in the cubing process. The interface includes a depiction of the equipment in the cubing process. A touch screen interface allows the user to control the equipment in the cubing process. In addition, information from the equipment is transmitted to the interface and conveyed to the user either through visual displays (e.g. numerical or graphical) or auditory signals (e.g. alarms or status beeps). The server may include software used to monitor the feed rate into the cuber with a modified proportional integral derivative (PID) algorithm in which the prime feedback input is a real-time electrical consumption signal derived from the motor driving the cuber.

4 Claims, 2 Drawing Sheets

INTEGRATED CUBER MANAGEMENT SYSTEM

FIELD

The system and method of the present invention pertains to an improved method for managing a cuber, or extruder, while processing recycled combustible materials into products capable of generating high heat outputs and, more particularly, to a system and method for using a graphical interface to monitor and control the cuber.

BACKGROUND

An increasing number of consumer products are made from thermoplastic resin such as, for example, adhesive liners and medical gowns. Some consumer products, such as disposable diapers, are primarily made up of thermoplastic resin and cellulosic fiber wherein the thermoplastic material provides a moisture-proof lining on the outside of the diaper and the cellulosic fiber provides the bulky absorbent media on the inside. The cellulosic fiber holds and retains all moisture, while the thermoplastic material ensures that there is no external leakage.

When products such as diapers, adhesive liners, hygiene pads and the like are manufactured, a certain amount of waste is inevitable, resulting in so-called "pre-consumer waste." In addition, many of these products are disposable in nature and, as a result, are used just once and thrown away resulting in "post-consumer waste." The ultimate disposal of pre-consumer and post-consumer waste typically involves transporting it to the local landfill. Environmentalists abhor this type of disposal as being wasteful both in the manufacture and disposal of these products. For example, the manufacture of disposable diapers requires forest products to obtain the necessary cellulose and the disposal of the diapers utilizes valuable landfill space. Moreover, the U.S. Environmental Protection Agency (EPA) has placed increase restrictions on landfill requirements. For example, the EPA has recently enforced the requirement of double lining landfills for disposal of paper mill sludge. Consequently, there has been a dramatic increase in cost for establishing new landfills that comply with EPA requirements for paper mill by-products.

In addition to the increased reluctance to use forest products and increased restrictions in landfill requirements, there has also be an increase in demand for new sources of energy. Combustible products made from cellulosic fibers and thermoplastic resins offer a higher BTU output and provide a clean-burning alternative to conventional fuels. However, use of available cellulosic waste as a fuel source has achieved only limited acceptance to date. One reason for this is the relatively low heating value of cellulose as compared to, for example, coal. For example, cellulosic fibers alone can have a heating value of less than 7,000 BTU's per pound, while coal generally has heating value in excess of 9,000 BTU's per pound. Another problem is that many consumer products have substantial tear-resistant properties because the polymers are highly cross-linked or otherwise heavily processed, making these products exceptionally difficult to shred or extrude.

Methods and systems for processing materials consisting substantially of thermoplastic resin and cellulosic fiber into combustible materials are well known in the art. Typically, these processes consist of placing the materials in slow-speed, high-torque shredders where the material is shredded to a consistent size and then moved by a conveyor line to a "cuber," or extrusion machine, where fuel cubes are extruded under pressure. However, there are a number of problems that arise with this process.

For example, in recent years, many companies have made significant advances in improving the tear-resistant properties of thermoplastic materials. These highly tear-resistant materials, by their very nature, are exceptionally difficult to process using conventional means. If these materials are processed through normal shredder devices, the shredder will quickly become bound-up and, in many cases, cease operating. Moreover, because the materials are combustible by nature, they have a propensity for catching fire if exposed to high heat or friction, such as during processing. As a result, if the operator is successful in maintaining the operation of the shredder, the friction involved in processing these materials creates an extreme fire hazard. There is a need, therefore, for a system for managing the processing of tear-resistant thermoplastics whereby the risk of fire hazard can be minimized.

In addition, because of the wide variety of materials included within the feeder stock, it is very common for the feeder to jam. Such jams are quite costly in terms of the downtime required to clear the jam as well as accumulating excessive wear on the machinery which results in an increase in the costs of both scheduled and non-scheduled maintenance. In addition, because the production level is inconsistent, it is difficult to integrate quantifiable and consistently measurable parameters into a closed loop system. In short, there is a need for a simple, highly intuitive system and method for monitoring and controlling the cuber, in which all key system process parameters can be read at a glance and adjusted in a matter of moments.

Historically, these systems have been managed through the use of traditional "switch and knob" interfaces. However, due to the number of elements involved in even a small cuber installation, such control panels consisted of literally hundreds of lever switches, push buttons, dials and meters that were spread over an area of many tens of square feet. Managing the safe and efficient flow of material through the cuber using this type of system is exceptionally difficult and often results in substantial downtime because the operator is unable to effectively manage all of the variables in the system.

Because of the difficulty in managing such a complex system using switches and knobs, some manufacturers have attempted to automate the process. In those instances, a portion of the switches and knobs described above have been replaced with first-generation touch screen panels. These interfaces provide a very limited, simple, graphical interface whereby systems or subsystems within the process are represented as a box, cylinder or the like. Although it can be appreciated that the graphical interface offers advantages over switches and knobs, the improved interface does not provide an effective means of managing the variables inherent in the operation of the cuber.

To understand the importance of an effective cuber control system, it is instructive to examine the complexities associated with the management of the flow of feedstock into the cuber. Under certain circumstances, the operator may simply fix the feed rate at a rate considerably lower than that which could potentially be supported by the process equipment. In this system, a rate is set on the variable speed drive (VSD) so that the greatest fluctuations in the cuber supply stream coupled with the minimum acceptable density/compressibility factors of the cubes would not exceed the ability of the cuber drive system to supply sufficient torque to the machinery to cube the input stream. This technique results in less jamming of the cuber, but employs the machinery at a rate significantly below its optimal potential so that plant production is artificially limited.

Alternatively, the operator may set the feed rate at a level significantly above that used in the above example. The person then attempts to monitor the cuber load factors using several means, including watching an ammeter displaying cuber motor current, listening to the sounds produced by the feeder and cuber, and "seat-of-the-pants" intuition. This technique results in short periods of high production, but greatly increases plant downtime due to jams resulting from overfeeding as well as outright equipment failure due to the machinery being exposed to significant overload situations occurring at a high frequency relative to overall runtime.

There is a need, therefore, for a compact, inclusive system for managing the operation of a cuber including startup of the equipment, heat monitoring and control during processing, alarm annunciation and acknowledgment, ancillary control shutdown and end-of-production shut down.

There is also a need for a cuber management system that is easy to learn and facilitates training of new operators.

BRIEF SUMMARY OF THE INVENTION

The present invention is for an improved method and system for monitoring and controlling the processing of products made of cellulosic fiber and thermoplastic resin. The system includes a graphical interface and a server attached to the equipment in the cubing process. The interface includes a depiction of the equipment in the cubing process. A touch screen interface allows the user to control the equipment in the cubing process. In addition, information from the equipment is transmitted to the interface and conveyed to the user either through visual (e.g. numerical or graphical) or auditory (e.g. alarms or status beeps) means. The server may include software used to monitor the feed rate into the cuber with a modified proportional integral derivative (PID) algorithm in which the prime feedback input is a real-time electrical consumption signal derived from the motor driving the cuber.

BRIEF DESCRIPTION OF THE DRAWINGS

A better understanding of the system and method of the present invention may be had by reference to the drawings, wherein.

DETAILED DESCRIPTION

Figure 1:
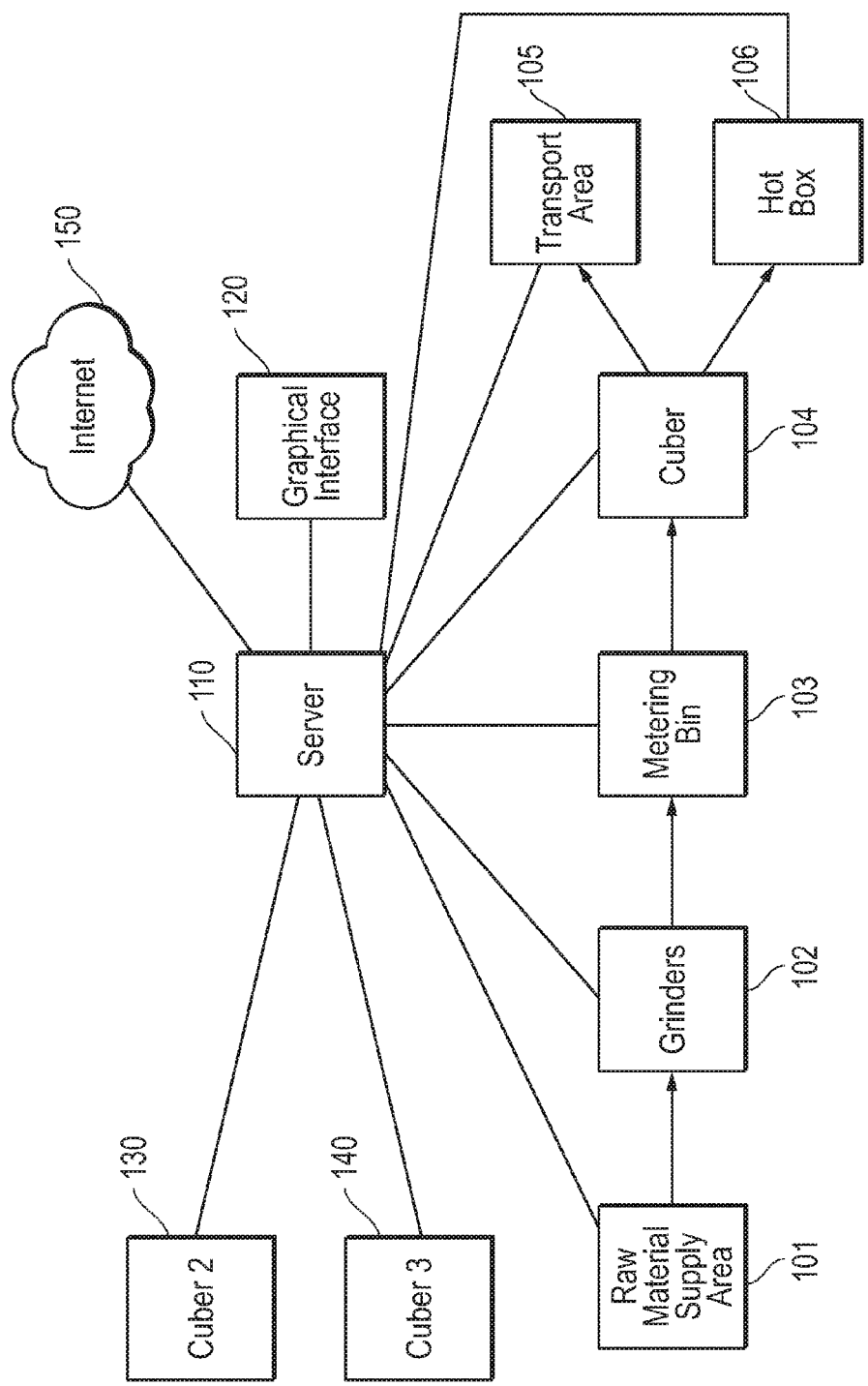
FIG. 1 shows a flow diagram of a cubing production process on which the graphical interface of the present invention can be implemented.

The present invention is an improved system and method for managing the operation of a cuber. While cubers are typically used in the processing of products made of cellulosic fiber and thermoplastic resin, it should be appreciated that the present invention is equally applicable to the processing of products or materials that have tear-resistant or other properties that create high heat and result in variable flow rates during production. Accordingly, the words, "highly cross-linked materials," "tear-resistant materials," and "materials that result in variable flow rates during processing" can be substituted for the terms "cellulosic fibers" or "thermoplastic resin" when used herein. Also, in general, the term "cubing process" means any process by which any thermoplastic and/or cellulosic material is converted into a densely compacted shape, whether or not in the configuration of a cube.

To effectively manage the wide variety of controls included in the operation of a cuber, it is necessary to develop a universal control management system. In one embodiment of the present invention, the universal control management system is accomplished through the use of a graphical interface which is connected to a server which is, in turn, connected to the cuber. The graphical interface of the present invention contains a depiction of the cubing process. Elements of the process include the supply of raw materials, grinding the feed materials, pre-cubing metering, the cubing process and conveying the finished products to the transport area.

The graphical interface is typically located adjacent to the cubing operation. The interface is connected to a server and, in turn, the server is communicatively connected to, and receives information from, the equipment used in the cubing process. The interface includes a display that provides data from each of the variables in the process to the user in real-time.

It is important to note that it is not necessary that the interface be a touch screen display. For example, the interface could allow the user to change the control variables through the use of an interface device. This interface device could be a mouse or other device, such as a joystick, a track ball, a touch pad, light pen or the like. However, due to the usually unfriendly conditions of the cuber environment, a touch-screen display or touch pad are preferred.

The server can take the form of a general purpose computer, a special purpose computer, a programmed microprocessor, or any other device capable of accepting and processing inputs, implementing a database, providing data to the interface and accepting commands from the interface in response to stimulus from the user. It should be appreciated that the server may be connected to, and therefore the interface may control, more than one cubing operation at any one time. In addition, if it is desirable to control the cubing operation remotely, the server may also be connected to a wide area network, an intranet, the Internet or any other type of distributed network.

In operation, the server is connected to the interface through either a wired or a wireless connection. The server receives data from control devices, such as sensors, relays or switches located on the equipment components of the cuber process and provides this data in user-understandable form (whether a numerical display, a graphical display, an auditory signal, or through some other method of delivering audio or visual information to the user) through the interface to the user. The user may elect to alter an input variable in which case he will, for example, touch the touch-screen display to change the setting. The interface sends a signal to the server which, in turn, sends a signal to the applicable control device (such as a switch, a valve, etc.) in the cubing process. The server may also collect and retain data, both from the control devices in the cubing process and from the user, in a relational database whereupon the information can be generated in report form or compared against prior period performances to determine trends and changes in the cuber's performance.

In a typical cuber management system, the control panel may be 15 feet long or more and almost entirely covered with switches and knobs for controlling the process. In the management system of the present invention, the interface is reduced significantly in size so that the user can efficiently adjust several variables at one time. This is important for several reasons. For one, the cubing process is inherently prone to creating fires, sometime in a non-trival fashion. By bringing all heat, feed, and ancillary temperature control variables and fault alarming together in one place in one simple form, the operator has a far better chance of mitigating problems before a fire occurs.

Because the interface is connected to the server rather than being directly coupled to the equipment in the cubing process, the system is considerably more flexible and powerful in controlling and monitoring the cubing process. Previously, nearly all such process systems were hardwired, meaning that each switch or knob was able to control a single aspect of the process. Because the interface of the present invention incorporates a software component, it is possible to make significant changes in fundamental aspects of the heat control system quickly, at minimal expense, and in most cases remotely via a distributed network link. For example, changing a plant over from one type of feedstock (waste paper) to another (carpet) could be done with a significantly lower expenditure of time and material than with a traditional control paradigm.

Another feature of the present invention is the ability to automatically bring portions of the system online during start-up and to automatically take portions of the equipment off-line during shut down. Previously, this was all performed manually by the operator. Beyond the process constraints previously listed, there are very real cost concerns in specifically how a large number of high horsepower fixed and VFD loads are powered up and down. With the emphasis on "peak billing" in the commercial environment, it is very important to balance plant startup rate with the reduction of peak loading factor. To this end, it is helpful to review a detailed analysis of the staging required to bring the overall cubing process on line versus the individual load factor each step represents. When this information is graphed relative to time, and then the peak factors for each element are introduced into the plot, one obtains a "map" of the optimal startup and shutdown timing, which can then be converted to a software algorithm. This algorithm functions bi-directionally and fully automatically, such that the operator need only provide the instruction to "start the plant," "pause here," or "shut down" and the equipment responds accordingly. All main and ancillary systems are stepped on and off as required, balancing the needs of the process with minimizing electrical consumption, especially peak consumption.

Another feature of the present invention is the ability to simplify and speed maintenance tasks on the cubing system. Because nearly all the electrical elements of the system are controlled by the main programmable logic controller (PLC), it is customary for a highly skilled technician to attempt to control all of the variables in an effort to operate the system manually. Using the interface of the present invention, a person with no computer or automation software skills whatsoever may manually operate any system element. In those cases where it is desirable to provide limited access to the interface, a password protection protocol can be incorporated into the functionality of the interface.

During processing, due to maintenance requirements or the need to change the handing afforded a specific material, it is sometimes necessary to idle or reverse the direction of operation of certain elements of a multiple cuber installation. Manual control makes this requirement awkward as best, and at worst greatly increase the chances that an operator may forget that a configuration change has been made. If, in this situation, certain elements of the process are engaged out of sequence or in the incorrect direction relative to others, damage to the machinery may result. The control interface of the present invention can be configured so that the elements of the process may only be powered up or down in the proper sequence at the proper time.

Referring now to the drawings, FIG. 1 shows a flow diagram of a process in which the management system of the present invention may be used. At the raw material supply area 101, feedstock is brought into the facility. The feedstock can consist, for example, of non-saleable waste materials from paper mills, such as disposable diapers, hygiene pads, hospital gowns and the like. The feedstock may be made up of thermoplastic material and cellulosic material. The thermoplastic material can be practically any available thermoplastic such as, but not limited to, polystyrene, polyethylene, polypropylene, acrylonitrile-butadienestyrene, acetal copolymer, acetal homopolymer, acrylic, polybutylene, and combinations thereof. However, thermoplastic materials most useful in the present invention are illustrated generally by the polyolefins such as polyethylene, polypropylene, polybutylene, and the like. Other thermoplastic resins are suitable so long as they have softening properties similar to the polyolefins, whereby they serve as lubricants for processing the feedstock, and as bonding agents to assist in bonding the layers together to make the finished combustible products.

Feedstock from the raw material supply area 101 is next fed into the grinders 102. As used herein, the term "grinder" refers to any device used for the purpose of reducing the size of the feedstock, including by grinding, shredding, pulverizing, chopping, granulating, crushing or the like. The purpose of the grinder 102 is to reduce the feedstock to a size suitable for passing through the cuber 104.

The ground feedstock is next passed through a cuber 104 consisting of an auger or augers, a press wheel and series of dies for the purpose of extruding the material into the desired shape. As the name implies, the cuber 104 can form the ground feedstock into cubes, however there are a number of other shapes that the cuber 104 may form that may be as, or more, desirable as combustible products. As used herein, the term "cube" refers to a discrete product of any size or shape that contains cellulosic material and/or thermoplastic material. The cube need not be square or even symmetrical. While it may be useful to form the products in the shape of cubes, they can be any suitable symmetrical configuration such as the shape of a tube or a sphere. In one embodiment of the invention, elongated "cubes" are formed that are approximately 1 inch by 2 inches. The cuber 104 is operated at a pressure of between about 7,000 and 10,000 psi. The desired temperature of the dies, discussed further below, is about between 300 and 400 degrees Fahrenheit, with the temperature depending on the specific blend of the material and the moisture content in the feedstock. This combination of high pressure and temperature serves to seal the edges of the cubes.

One or more of the equipment in the raw material supply area 101, the grinders 102, the metering bin 103, or the cuber 104, as well as other equipment tangentially related to the cubing process, may be connected to the server 110. As previously described, the server can be a general purpose computer, a special purpose computer, a programmed microprocessor, or any other device capable of accepting and processing inputs, implementing a database, providing data to the interface and accepting commands from the interface in response to stimulus from the user. The server 110 may be connected to other cuber process systems 130 and 140 and may also be connected to a distributed network, such as the Internet 150.

In addition to processing information from the cubing process to the interface and from the interface to the cubing process, the server can record and save such information either continuously or on a periodic basis. Such information is valuable in determining when the equipment may need maintenance, in assessing historical production trends and in generating production reports.

One of the variables being monitored and controlled in one embodiment of the invention is a sensor which is coupled to the conveyor feeding material into the cuber 104. The sensor can be a standard commercial current transformer which outputs a signal proportional to the three phase AC current drawn by the cuber 104 main drive motor. This is fed into a high speed analog to digital port attached to the PLC central processing unit. The speed of this entire conversion chain is such that the PLC, for all practical purposes, has real-time load information. The variable speed drive (VSD) is controlled by a digital to analog converter driven by the PLC. This signal, like the input sensor, essentially responds in real time. Consequently, it is possible to stop, start, accelerate or decelerate the feedstock flow to the cuber 104 with a latency limited only by the mechanical inertia of the material on the feeder conveyor belt. In one embodiment of the present invention, software operating on the server 110 is used to monitor and control the feed rate into the cuber 104. The software uses a modified proportional integral derivative (PID) algorithm.

Figure 2:
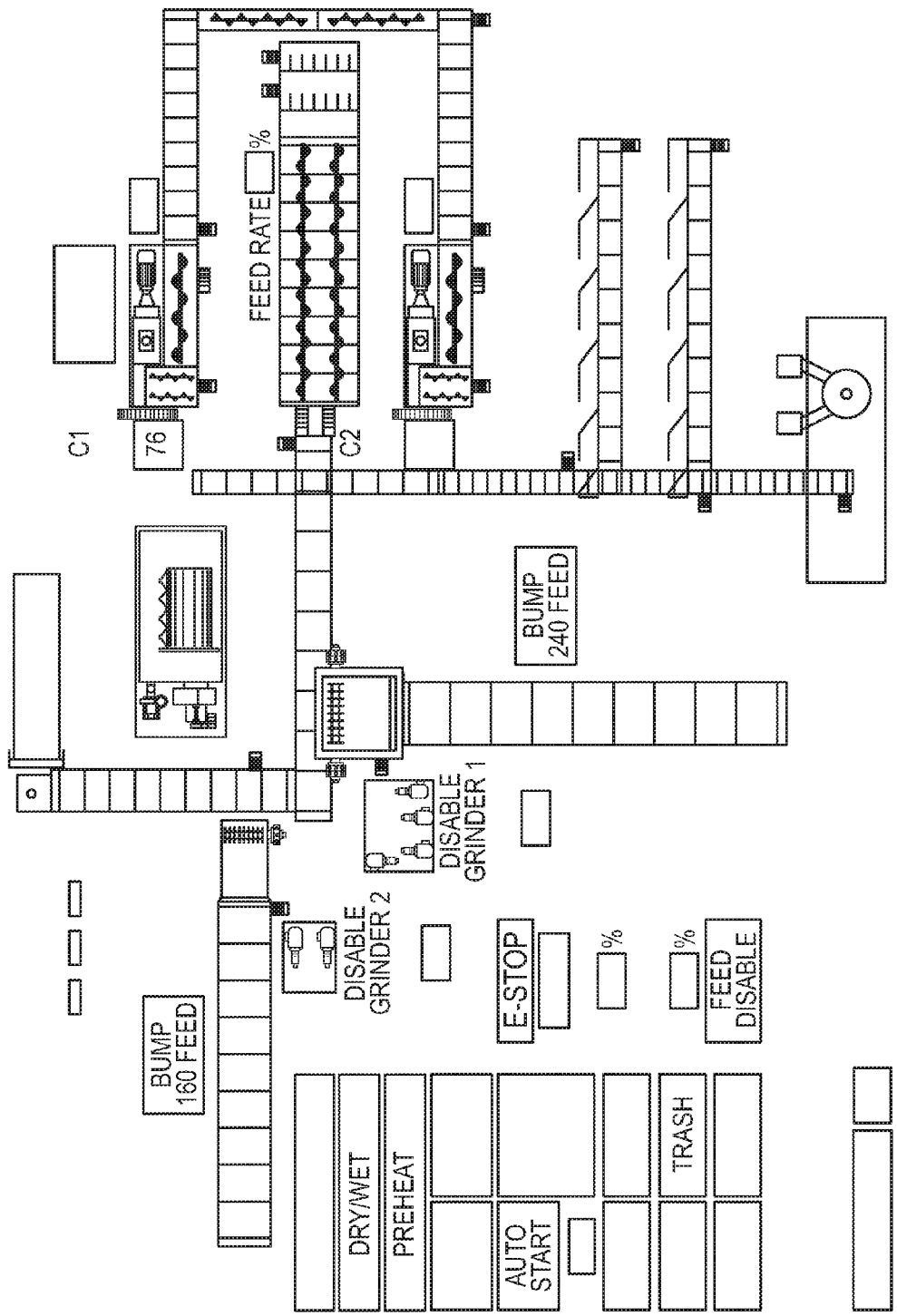
FIG. 2 shows one embodiment of the graphical interface for the cuber management system of the present invention.

FIG. 2 shows one embodiment of the graphical interface for the cuber management system of the present invention. A diagram on the interface depicts an overhead plan view of the cubing process including the cuber and the grinder, with each piece of equipment being depicted as an icon, and the conveyors used in transporting material between each piece of equipment. The equipment depicted on the interface is controlled primarily through the use of the touch-screen display. Although the embodiment of the interface in FIG. 2 shows a particular layout for the cubing process, any combination of one or more of the components in the cubing process in this or any other configuration could be used. Moreover, the layout of the equipment may or may not be shown in its actual relative location and may or may not be drawn to scale.

It should be appreciated that each of the different types of equipment represented by the icons in FIG. 2 are identified by using different graphic representations of the corresponding pieces of equipment that are embedded in or contained within the various icons. In particular, each different graphic representation closely corresponds to the visual appearance of the correspondingly represented piece of equipment. Furthermore, in this embodiment, the icon representing each particular piece of equipment is physically located within the shop floor representation at a location that closely corresponds to the actual location of the represented piece of equipment. Accordingly, even unsophisticated workers or workers completely unfamiliar with the graphical interface controller of this invention can readily relate each selectable icon with the corresponding piece of equipment.

The information from the touch-screen display is processed by the server. From the server, the processed information is sent to the applicable equipment for implementation.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of possible of processing equipment, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A cuber control system comprising:
    a user interface containing a graphical depiction of equipment used in a cuber process wherein said user interface is capable of receiving input from a user through an interface device and wherein said equipment includes at least one extruder;
    a server communicatively connected to said user interface;
    a program operating on said server that initiates startup and shutdown of said equipment in said cuber process in a desired sequence;
    one or more control devices capable of controlling or monitoring one or more aspects of the operation of said equipment, wherein said one or more control devices are communicatively connected to said server, and wherein at least one of said control devices is controllable by, or capable of receiving information from, said user interface through said server;
    said cuber operable in a forward direction and in a reverse direction and, in response to transitioning between said forward direction and said reverse direction, said server and program performs said shutdown in one direction and said startup in another direction in said desired sequence.

2. The system of claim 1 further comprising password protection for said user interface.

3. The system of claim 1 wherein said equipment includes at least one extruder and pre-consumer waste is processed through said extruder.

4. The system of claim 1 wherein an application on said server generates reports showing historical production trends.

* * * * *